US009255654B2

(12) United States Patent
Warren et al.

(10) Patent No.: US 9,255,654 B2
(45) Date of Patent: Feb. 9, 2016

(54) HARD LEAD EGRESS ADAPTER FOR AN INSTRUMENTATION COMPONENT

(75) Inventors: Eli Cole Warren, Wethersfield, CT (US); Nicholas R. Leslie, South Berwick, ME (US)

(73) Assignee: United Technologies Corporation, Hartford, CT (US)

(*) Notice: Subject to any disclaimer, the term of this patent is extended or adjusted under 35 U.S.C. 154(b) by 424 days.

(21) Appl. No.: 13/617,522

(22) Filed: Sep. 14, 2012

(65) Prior Publication Data

US 2014/0077461 A1    Mar. 20, 2014

(51) Int. Cl.
| | |
|---|---|
| *F16L 5/02* | (2006.01) |
| *F16L 5/10* | (2006.01) |
| *H02G 3/22* | (2006.01) |

(52) U.S. Cl.
CPC ...... *F16L 5/02* (2013.01); *F16L 5/10* (2013.01); *H02G 3/22* (2013.01); *Y10T 29/49966* (2015.01)

(58) Field of Classification Search
CPC .............. F16L 5/00; F16L 5/02; F16L 5/04; F16L 5/10
USPC .................................. 277/602, 606
See application file for complete search history.

(56) References Cited

U.S. PATENT DOCUMENTS

| | | | |
|---|---|---|---|
| 696,747 | A | 4/1902 | Rigby |
| 4,482,161 | A * | 11/1984 | Izzi, Sr. ............ 277/606 |
| 6,400,167 | B1 | 6/2002 | Gessford et al. |
| 6,636,054 | B2 | 10/2003 | Lyford et al. |
| 7,025,628 | B2 | 4/2006 | LaMeres et al. |
| 7,056,134 | B2 | 6/2006 | Martin et al. |
| 7,221,170 | B2 | 5/2007 | Lee et al. |
| 7,492,177 | B1 | 2/2009 | Campbell |
| 2013/0220138 | A1 * | 8/2013 | Deuber ............ 99/289 R |
| 2014/0302212 | A1 * | 10/2014 | Njaastad ............ 426/477 |

OTHER PUBLICATIONS

International Preliminary Report on Patentability for International Application No. PCT/US2013/058657 mailed Mar. 26, 2015.

* cited by examiner

*Primary Examiner* — Gilbert Lee
(74) *Attorney, Agent, or Firm* — Carlson, Gaskey & Olds, P.C.

(57) ABSTRACT

An instrumentation component includes an instrumentation portion, a casing at least partially surrounding the instrumentation portion, a lead protruding from the instrumentation portion through a lead egress hole in the casing, a lead egress adapter, and a lead egress cap. The lead egress adapter is situated in the lead egress hole. The lead egress adapter includes a cup portion and a lip portion at least partially circumscribing the cup portion. The lead egress adapter includes a hole in the cup portion. The lead protrudes through the cup hole and the cup hole is tight fit to the lead. A potting material fills a remainder of the cup portion. The lip portion of the lead egress adapter contacts the casing. A lead egress cap seals the lead egress adapter to the casing. The lead egress cap further includes a cap hole through which the lead protrudes, and the cap hole is tight fit to the lead egress.

11 Claims, 8 Drawing Sheets

HARD LEAD EGRESS ADAPTER FOR AN INSTRUMENTATION COMPONENT

BACKGROUND OF THE INVENTION

The present disclosure is related to a hard lead egress from an instrumentation component, and more specifically toward an adapter for the same.

Mechanical systems, such as turbine engine systems for commercial aircraft, often include instrumented engine cases, heat shielded instrumentation components, or other similar instrumentation components. It is common in these applications to include a hard lead connecting the instrumentation component to another system. In such a case, the hard lead protrudes through an egress hole in the outer wall of the instrumentation compartment.

It is desirable to seal the egress hole, and thereby prevent gas leakage into and out of the instrumentation compartment. Known methods for sealing the egress hole use a potting material to fill the gap between the case and the lead, and a tack strap (cap) on the outer surface of the case to cover the potting. As a result of natural wear and tear, as well as thermal expansion and contraction, the potting material can break loose and fall into the instrumentation compartment, creating gas leakage paths into and out of the instrument compartment.

SUMMARY OF THE INVENTION

An instrumentation component according to an exemplary embodiment of this disclosure, among other possible things includes an instrumentation portion, a casing at least partially surrounding the instrumentation portion, a lead protruding from the instrumentation portion through a lead egress hole in the casing, a lead egress adapter situated in the lead egress hole, the lead egress adapter includes a cup portion and a lip portion at least partially circumscribing the cup portion, the lead egress adapter includes a hole in the cup portion, the lead protrudes through the cup hole and the cup hole is tight fit to the lead, and wherein a potting material fills a remainder of the cup portion, the lip portion of the lead egress adapter contacts the casing, and a lead egress cap sealing the lead egress adapter to said casing, the lead egress cap further comprises a cap hole through which the lead protrudes, and the cap hole is tight fit to the lead egress.

In a further embodiment of the foregoing instrumentation component the cup hole is tight fit to the lead with a clearance of between 0.001 inches and 0.004 inches.

In a further embodiment of the foregoing instrumentation component the cap hole is tight fit to the lead with a clearance of between 0.001 inches and 0.004 inches.

In a further embodiment of the foregoing instrumentation component the lip portion of the lead egress adapter further comprises a tack weld trough circumscribing the cup portion and the tack weld trough is thinner than a non-tack weld trough portion of the lip portion along an axis defined by the lead.

In a further embodiment of the foregoing instrumentation component a potting material fills the trough portion.

In a further embodiment of the foregoing instrumentation component a brazing chamfer is located on an outer edge of the lip portion, and a braze connects the brazing chamfer to the casing.

In a further embodiment of the foregoing instrumentation component the cap includes a tack weld portion extending beyond an outer circumference of the lip portion of the lead egress adapter, and the tack weld portion is tack welded to the casing.

In a further embodiment of the foregoing instrumentation component the lead extends through the lead egress adapter approximately perpendicular to the casing.

In a further embodiment of the foregoing instrumentation component the lead extends through the lead egress adapter at an angle relative to the casing.

In a further embodiment of the foregoing instrumentation component the cup portion includes a cup portion wall, and the cup portion wall extends beyond the lip portion of the lead egress adapter along the axis defined by the lead.

In a further embodiment of the foregoing instrumentation component the cap further includes a deformed portion, and the deformed portion conforms to an outer edge of the lip portion of the adapter.

In a further embodiment of the foregoing instrumentation component the cap is tack welded to the lead egress adapter.

In a further embodiment of the foregoing instrumentation component the cap is tack welded to the lead egress adapter.

A method for assembling an instrumentation component according to an exemplary embodiment of this disclosure, among other possible things includes routing a lead through a hole in a housing of the instrumentation component and connecting the lead to the instrumentation component, positioning a lead egress adapter on the lead such that a cup portion of the lead egress adapter is located in the hole, filling the cup portion of the lead egress adapter with a potting compound, and placing a cap portion over the lead egress adapter, thereby sealing the hole in the housing.

In a further embodiment of the foregoing method the step of positioning a lead egress adapter on the lead such that a cup portion of the lead egress adapter is located in the hole includes attaching a lip portion of the adapter to the housing via a tack weld in a tack weld trough of the lip portion.

In a further embodiment of the foregoing method the step of positioning a lead egress adapter on the lead such that a cup portion of the lead egress adapter is located in the hole includes attaching the lead egress adapter to the housing via a brazing circumscribing a lip portion of the lead egress adapter.

In a further embodiment of the foregoing method the step of placing a cap portion of the lead egress adapter includes deforming a deformation portion of the cap about the lead egress adapter.

In a further embodiment of the foregoing method the step of placing a cap portion of the lead egress adapter includes positioning a deformed portion of the cap about an outer circumference of a lip portion of the lead egress adapter.

These and other features of this application will be best understood from the following specification and drawings, the following of which is a brief description.

DETAILED DESCRIPTION

Figure 1:
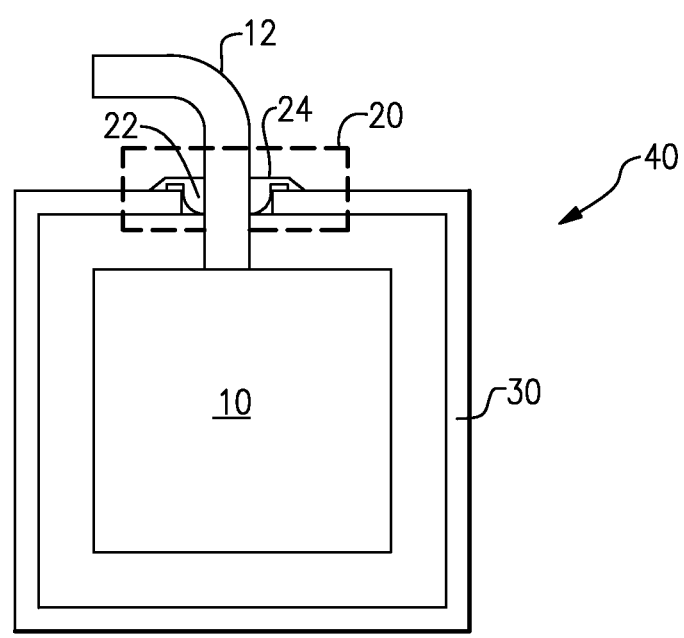
FIG. 1 schematically illustrates a component with a hard lead protruding through the lead casing.

FIG. 1 illustrates an instrumentation portion 10 of a component 40 contained within a casing 30, such as a heat shield. The component 40 includes a hard lead 12 for connecting the instrumentation portion 10 to another system. In some examples the hard lead 12 is an electrical lead, and in other examples, the hard lead 12 is a tubular gas connection. The hard lead 12 protrudes through a hard lead egress 20 in the casing 30. Sealing the hard lead egress 20 is a hard lead egress adapter 22 and a hard lead egress cap 24. The combination of the hard lead egress adapter 22, potting material and the hard lead egress cap 24 prevents gasses from leaking into or out of the casing 30.

Figure 2:
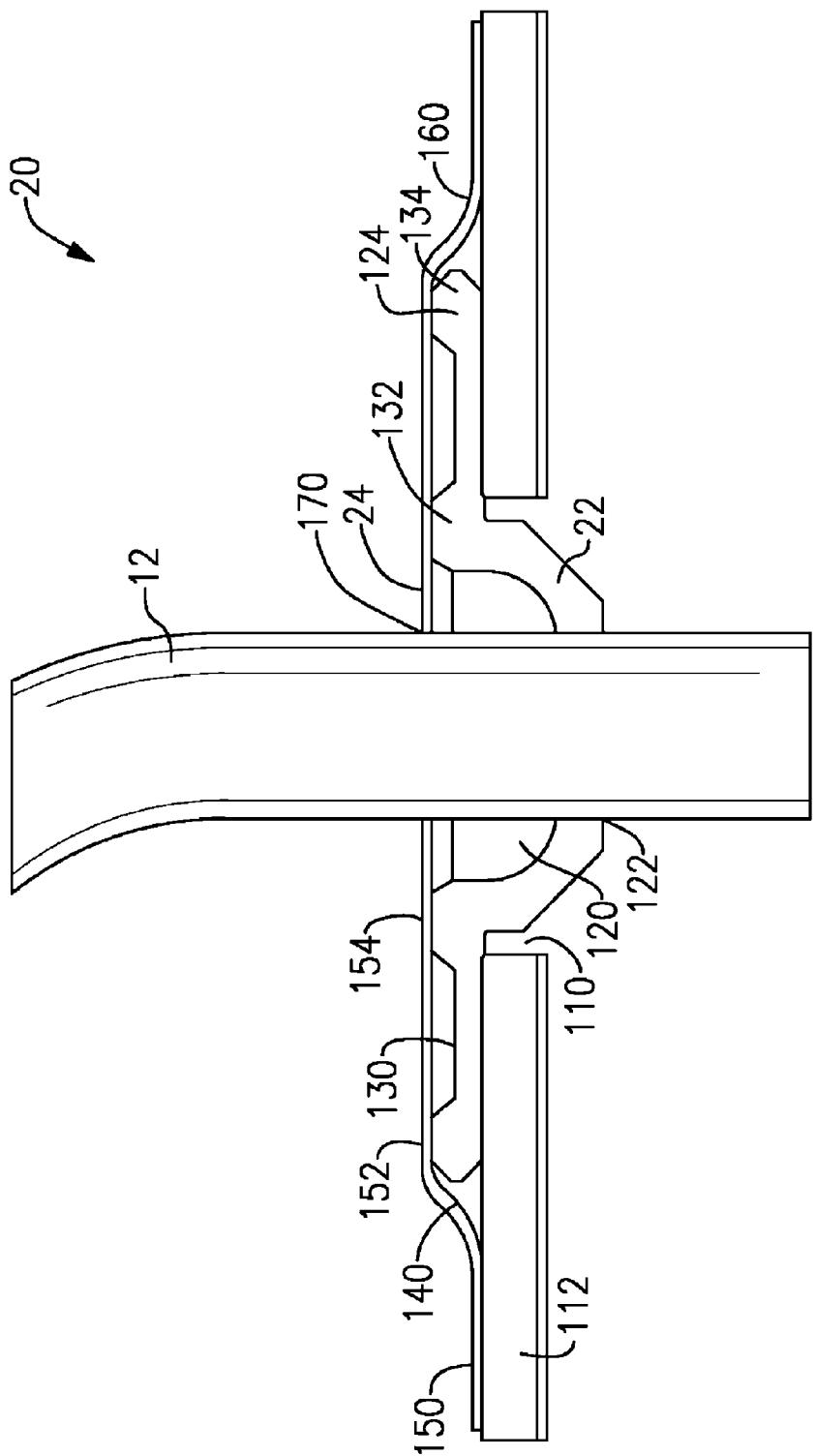
FIG. 2 schematically illustrates a zoomed in cross-sectional view of the hard lead egress of FIG. 1.

FIG. 2 illustrates a zoomed in schematic view of the hard lead egress 20 of FIG. 1. The hard lead 12 protrudes through a hole 110 in the casing 112. The hole 110 is larger in diameter than the diameter of the hard lead 12. A lead egress adapter 22 is fit around the hard lead 12 and fills the hole 110. The lead egress adapter 22 includes a cup portion 120 positioned in the hole 110 in the casing 112 and a lip portion 124 connecting the lead egress adapter 22 to the casing 30.

The cup portion 120 of the lead egress adapter 22 includes a hole 122 that is sized to tightly fit the hard lead 12. For the purposes of this disclosure a tight fit is a fit in which the gap between the walls of a hole and the lead passing through the hole is sufficiently small, such that the lead is gripped by the walls of the hole. In one example, the hole 122 is sized to a clearance of between 0.001 and 0.004 inches of the diameter of the hard lead 12. The remainder of the cup portion 120 is filled with a potting material that aids in the sealing.

The lip portion 124 of the lead egress adapter 22 includes a thin tack weld trough 130 that circumscribes the cup portion 120. The lip portion 124 further includes two thicker sealing portions 132, 134 that facilitate a seal between the lead egress cap 24 and the lead egress adapter 22 by contacting the lead egress cap 24. A brazing chamfer 140 surrounds the outer surface of the lip portion 124. Brazing the egress adapter to the casing provides a seal and a secondary connection between the lead egress adapter 22 and the casing 112. The primary connection between the lead egress adapter 22 and the casing 112 is a tack weld in the tack weld trough 130.

The lead egress cap 24 is placed around the hard lead 12 and over the lead egress adapter 22. The lead egress cap 24 is thin enough to facilitate a tack weld and is held in place by a tack weld connecting a tack weld portion 150 of the lead egress cap 24 to the casing 112. In alternative examples, the lead egress cap 24 can be tack welded to the lead egress adapter 22 at alternative tack weld locations 152, 154.

A combination of the lead egress cap 24 and the cup portion 120 of the lead egress adapter 22 ensure that the potting material within the cup portion 120 stays in place after wear and tear has loosened the potting material, and prevents the potting material from falling into the casing 112.

The lead egress cap 24 further includes a deformed region 160 where the lead egress cap 24 is deformed to fit the adapter lip portion 124. Depending on the material used to make, and the thickness of, the lead egress cap 24, the deformed region 160 can be created before assembly or press fit to the lead egress adapter 22 during assembly. In the Illustrated example of FIG. 2, the lead egress cap 24 includes a hole 170 to accommodate the hard lead 12. In alternate examples, the lead egress cap 24 includes a slit deformed around the hard lead 12 which can be sealed by a seam weld. In yet another alternate example, the lead egress cap 24 includes both a slit and the hole 170. In some examples, a gap above the tack weld trough 130 and/or a gap between the deformed region 160 of the lead egress cap 24 and the lead egress adapter 22 can be filled with additional potting material thereby improving the seal provided by the lead egress adapter 22 arrangement.

Figure 2A:
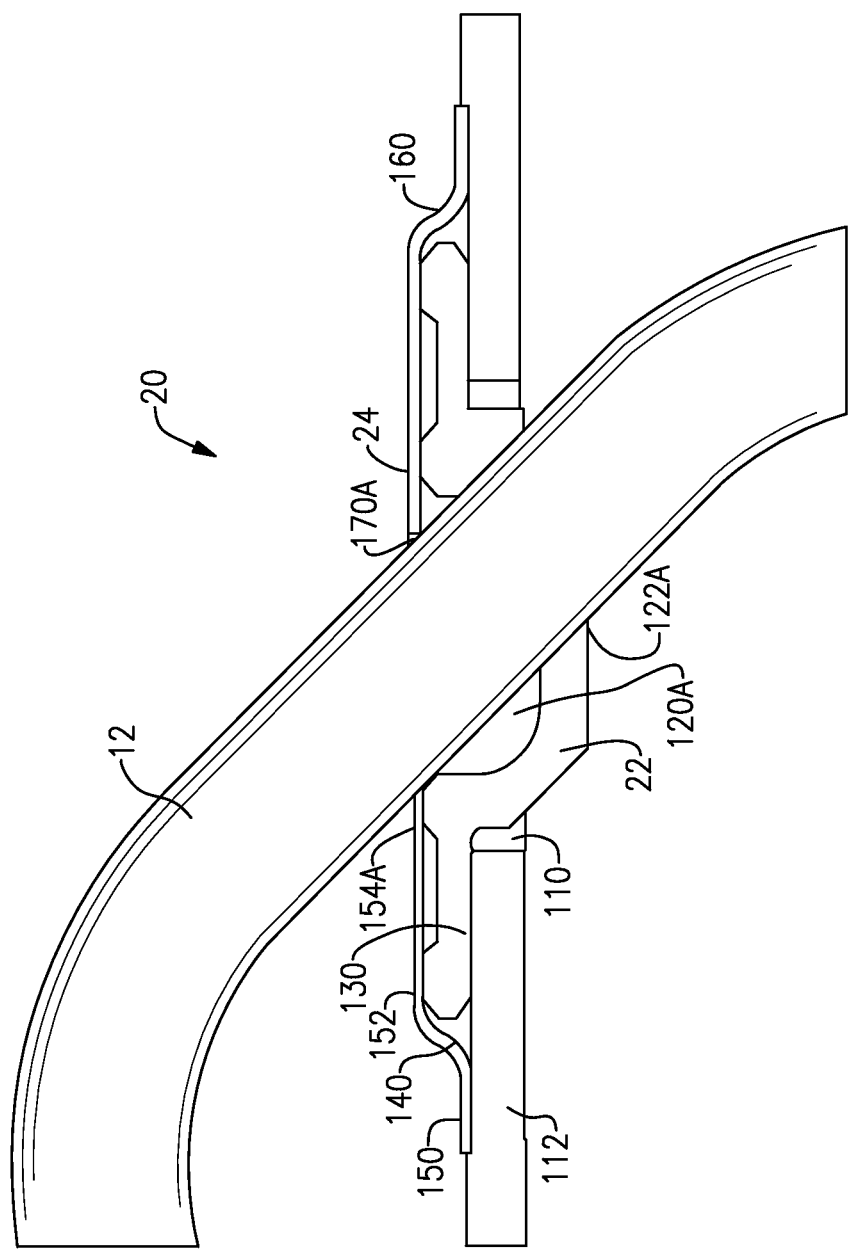
FIG. 2A schematically illustrates a zoomed in view of an alternate hard lead egress for FIG. 1.

FIG. 2A schematically illustrates a lead egress adapter 22 arrangement that accommodates an angled hard lead 12. The illustrated hard lead 12 is at a 45° angle relative to the casing 112. In order to accommodate the angled lead 12, the hole 122A in the cup portion 120A is angled, as is the hole 170A in the lead egress cap 154A. Proper alignment and orientation of the hole 170A and the hole 122A can be determined based on the particular angle of the hard lead 12 in light of the present disclosure.

Figure 2B:
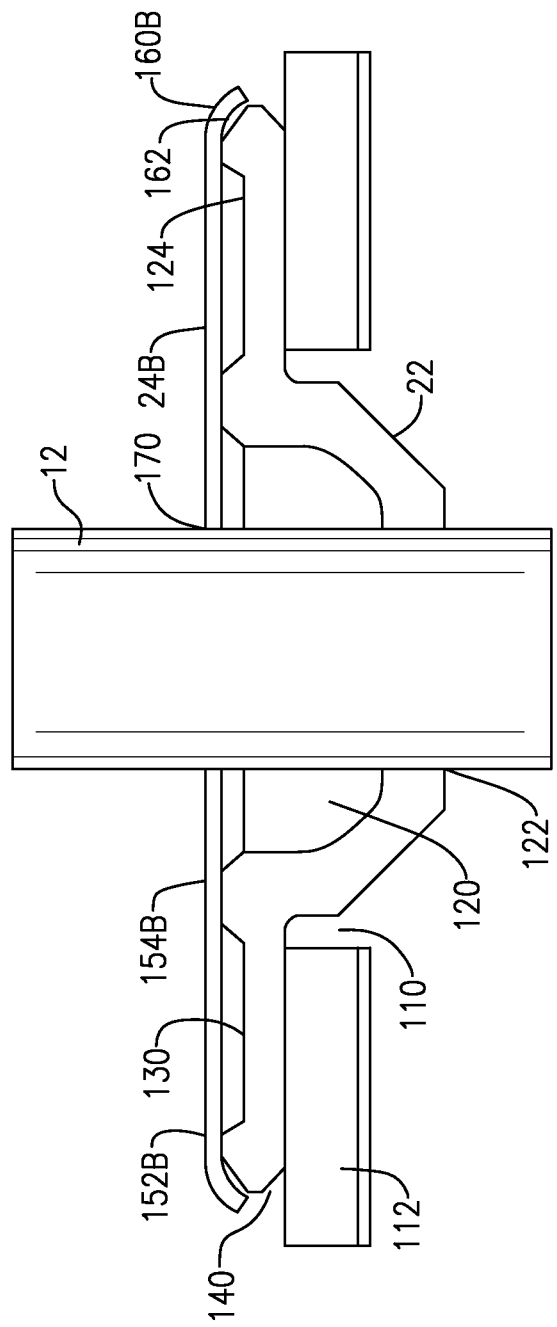
FIG. 2B schematically illustrates a zoomed in view of a second alternate hard lead egress for FIG. 1.

FIG. 2B schematically illustrates a second alternative lead egress adapter 22 including a shortened lead egress cap 24B. In the illustrated example of FIG. 2B, the lead egress cap 24B extends only part way through the deformed region 160B, and ends at the outer circumference of the lip portion 124. As the lead egress cap 24B does not extend to the tack weld region 150 of FIG. 2, the lead egress cap 24B is connected to the lead egress adapter 22 via the alternate cap tack weld locations 152B, 154B. The lead egress adapter 22 and the hard lead 12 of FIG. 2 remain unchanged in the example of FIG. 2B.

Figure 3:
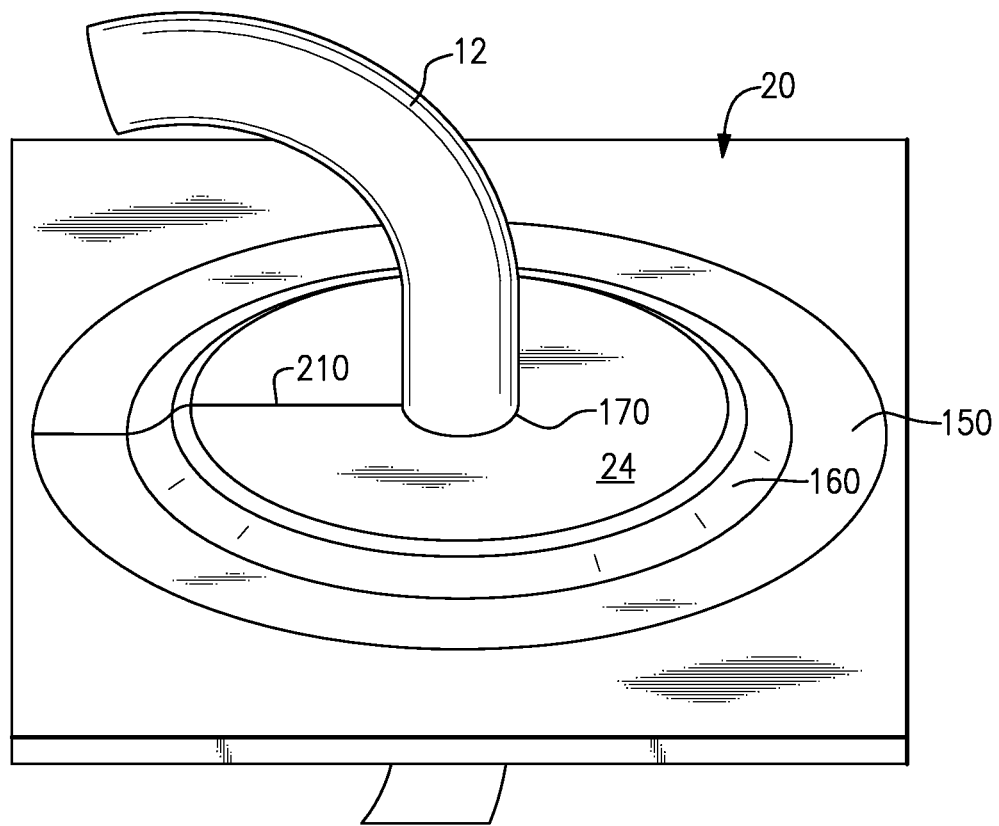
FIG. 3 schematically illustrates an external isometric view of the hard lead egress of FIG. 1.

FIG. 3 illustrates an isometric top view of the lead egress 20 of FIG. 1. The lead egress cap 24 includes a hole 170 and a seam 210. In the illustrated installed configuration, a seam 210 is included to ease the assembly of the lead egress cap 24 on top of the lead egress adapter 22 (illustrated in FIG. 2). Once in position, the hole 170 in the lead egress cap 24 is tight fit to the lead 12 and the seam 210 is closed. In one example, the tight fit is at a tolerance of between 0.001 and 0.004 inches. Depending on the material used to make, and the thickness of, the lead egress cap 24, the deformed region 160 can be created before assembly or press fit to the lead egress adapter 22 during assembly.

In some examples, the lead egress cap 24 is pulled into tension prior to tack welding the lead egress cap 24 to the casing 112. By placing the lead egress cap 24 in tension, the potting material sealed between the lead egress cap 24 and the lead egress adapter 22 is held in compression, thereby enhancing the seal.

Figure 4:
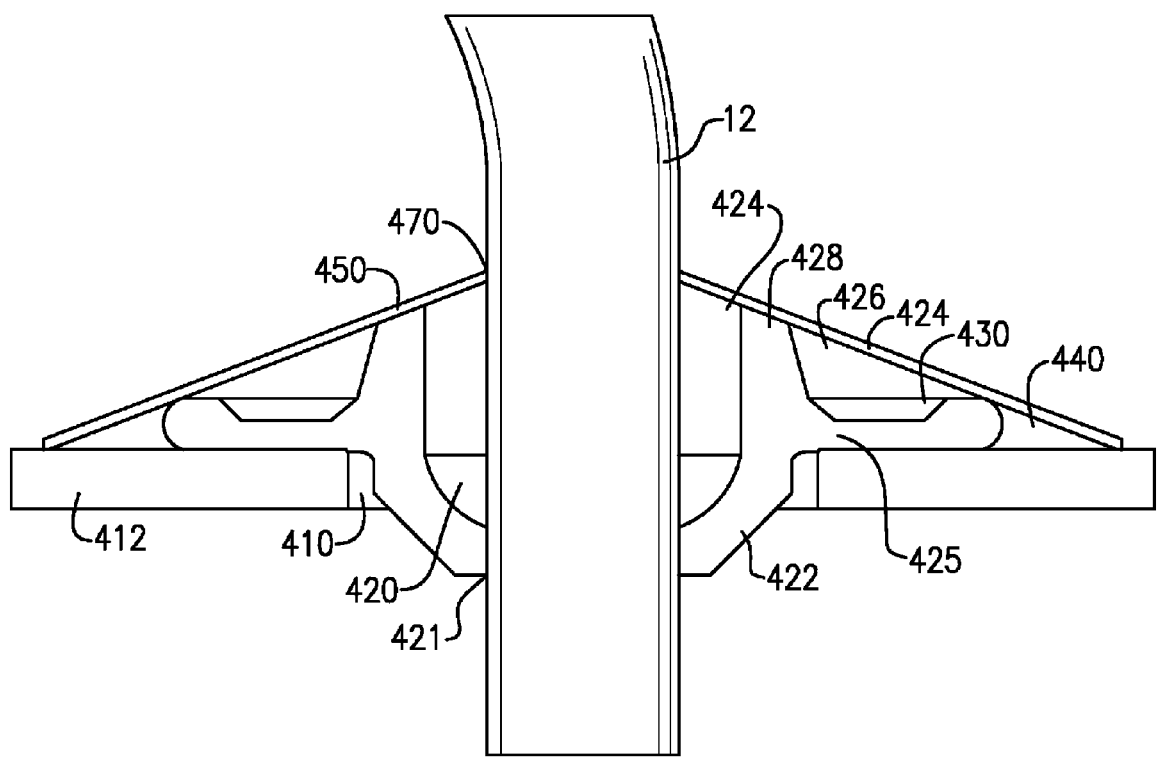
FIG. 4 schematically illustrates a zoomed in cross-sectional view of a hard lead egress in an alternate component.

FIG. 4 illustrates an alternate lead egress adapter design including an extended cup portion 424. As with the standard lead egress adapters 22, the hard lead 12 extends through a hole 421 in the cup portion 120 of the lead egress adapter 422 and through a hole 470 in the lead egress cap 24. A top portion 428 of the lead egress adapter 422 between the cup portion 420 and the trough portion 430 is angled to match the angle of the lead egress cap 24, thereby allowing a tack weld to connect the lead egress cap 24 to the lead egress adapter 422. The angled lead egress cap 424 increases the volume of the potting material that can be incorporated in the cup portion 420 and in a gap 426 above the tack weld trough 430 in the lip portion 425 of the lead egress adapter 22.

Figure 5:
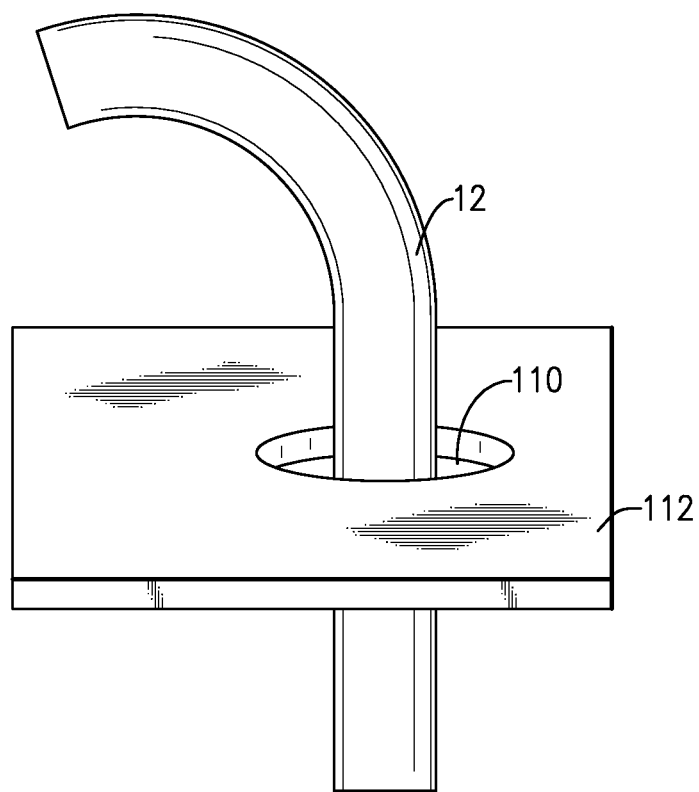
FIG. 5 schematically illustrates an incremental step in a lead assembly processor.
Figure 6:
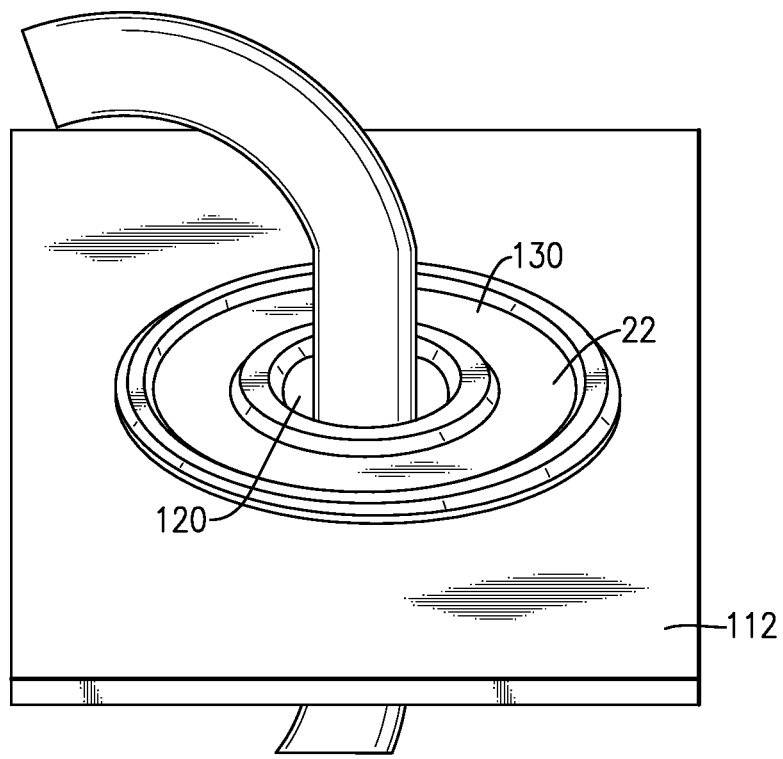
FIG. 6 schematically illustrates another incremental step in a lead assembly process.

A process for assembling the hard lead egress 20, illustrated in FIG. 1, is described herein with reference to FIGS. 5 and 6, each of which shows an intermediate step of the assembly. Initially, the hard lead 12 is navigated through the hole 110 in the casing 112 and connected to the instrumentation component 10 (illustrated in FIG. 1) within the casing 112. The hole 110 is significantly larger than the diameter of the hard lead 12, making routing the hard lead 12 through the casing 112 easy and minimizing damage to the hard lead 12 as a result of the routing.

Once the hard lead 12 is in place, the hard lead egress adapter 22 is slid over the hard lead 12, with the hard lead 12 protruding through the hole 122 in the hard lead egress adapter 22 (illustrated in FIG. 2). The hard lead egress adapter 22 is slid along the hard lead 12 until the lip portion of the hard lead egress adapter 22 contacts the casing 112.

When the lip portion 124 is contact in the casing 112, the hard lead egress adapter 22 is attached to the casing 112 by a tack weld in the tack weld trough 130. The tack weld trough is thin enough to facilitate a tack weld. An optional secondary connection between the hard lead egress adapter 22 and the casing 112 is made by brazing the outer circumference of the hard lead egress adapter 22 to the casing 112.

When the hard lead egress adapter 22 is positioned and connected to the casing 112, the cup portion 120 of the hard lead egress adapter 22 is filled with a potting material, and the potting material is allowed to cure according to known potting techniques. If an alternate adapter is utilized that includes potting material at a second location, such as the tack weld trough 130 or adjacent to the brazing, the second location potting material is placed and allowed to cure during this step as well.

After the potting material has been allowed to cure, the lead egress cap 24 is placed over the hard lead 12 and attached to the casing 112 and the hard lead egress adapter 22 as described above with regard to any of the example adapter configurations described herein.

An alternative to the above method includes installing the cap while the potting material is curing, thus guaranteeing full contact with the potting material thereby enhancing the seal.

While the above-described examples each illustrate a component with a single hard lead, it is understood with regard to this disclosure that similar components with multiple hard leads can incorporate this design by utilizing local adapters. Furthermore, it is understood that the adapter arrangement can be modified to accommodate semi-hard or soft leads by one of skill in the art having the benefit of this disclosure.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An instrumentation component comprising:
    an instrumentation portion;
    a casing at least partially surrounding said instrumentation portion;
    a lead protruding from the instrumentation portion through a lead egress hole in the casing;
    a lead egress adapter situated in said lead egress hole, wherein said lead egress adapter includes a cup portion and a lip portion at least partially circumscribing the cup portion, wherein said lead egress adapter includes a hole in said cup portion, wherein said lead protrudes through said cup hole and said cup hole is tight fit to said lead, and wherein a potting material fills a remainder of said cup portion;
    wherein said lip portion of said lead egress adapter contacts said casing; and
    a lead egress cap sealing said lead egress adapter to said casing, wherein said lead egress cap further comprises a cap hole through which said lead protrudes, and wherein said cap hole is tight fit to said lead egress;
    wherein said lip portion of said lead egress adapter further comprises a tack weld trough circumscribing said cup portion and wherein said tack weld trough is thinner than a non-tack weld trough portion of said lip portion along an axis defined by the lead; and
    a potting material filling said trough portion.

2. The instrumentation component of claim 1, wherein said cup hole is tight fit to said lead with a clearance of between 0.001 inches and 0.004 inches.

3. The instrumentation component of claim 1, wherein said cap hole is tight fit to said lead with a clearance of between 0.001 inches and 0.004 inches.

4. The instrumentation component of claim 1, wherein said cap further comprises a tack weld portion extending beyond an outer circumference of said lip portion of said lead egress adapter, and wherein said tack weld portion is tack welded to said casing.

5. The instrumentation component of claim 1, wherein said lead extends through said lead egress adapter approximately perpendicular to said casing.

6. The instrumentation component of claim 1, wherein said lead extends through said lead egress adapter at an angle relative to said casing.

7. The instrumentation component of claim 1, wherein said cup portion includes a cup portion wall, and wherein said cup portion wall extends beyond said lip portion of said lead egress adapter along the axis defined by the lead.

8. The instrumentation component of claim 1, wherein said cap further includes a deformed portion, and wherein said deformed portion conforms to an outer edge of said lip portion of said adapter.

9. The instrumentation component of claim 8, wherein said deformed portion further forms a gap between said deformed portion as said lead egress adapter and wherein said gap is filled with a potting material.

10. The instrumentation component of claim 1, wherein said cap is tack welded to said lead egress adapter.

11. An instrumentation component comprising:
    an instrumentation portion;
    a casing at least partially surrounding said instrumentation portion;
    a lead protruding from the instrumentation portion through a lead egress hole in the casing;
    a lead egress adapter situated in said lead egress hole, wherein said lead egress adapter includes a cup portion and a lip portion at least partially circumscribing the cup portion, wherein said lead egress adapter includes a hole in said cup portion, wherein said lead protrudes through said cup hole and said cup hole is tight fit to said lead, and wherein a potting material fills a remainder of said cup portion;
    wherein said lip portion of said lead egress adapter contacts said casing, and includes a brazing chamfer on an outer edge of said lip portion and a braze connecting said brazing chamfer to said casing; and
    a lead egress cap sealing said lead egress adapter to said casing, wherein said lead egress cap further comprises a cap hole through which said lead protrudes, and wherein said cap hole is tight fit to said lead egress.

* * * * *